United States Patent [19]
Hintz

[11] Patent Number: 5,648,163
[45] Date of Patent: Jul. 15, 1997

[54] MAGNETO-OPTIC RECORDING MEDIUM HAVING MAGNETO-OPTIC FILM LAYERS SEPARATED BY YTTRIUM OXIDE

[75] Inventor: Michael B. Hintz, Mahtomedi, Minn.

[73] Assignee: Imation Corp., St. Paul, Minn.

[21] Appl. No.: 313,335

[22] Filed: Sep. 27, 1994

[51] Int. Cl.$^6$ ............................................. G11B 5/66
[52] U.S. Cl. .................. 428/332; 428/336; 428/694 ML; 428/694 SC; 428/694 DE; 428/694 RE; 428/694 XS; 428/694 MM; 428/694 IS; 428/900; 365/122; 360/59; 363/13
[58] Field of Search ........................... 428/332, 336, 428/694 ML, 694 SC, 694 DE, 694 RE, 694 XS, 694 MM, 694 IS, 900; 365/122; 360/59; 363/13

[56] References Cited

U.S. PATENT DOCUMENTS

| | | | |
|---|---|---|---|
| 4,666,789 | 5/1987 | Gueuguou | 428/611 |
| 4,743,502 | 5/1988 | Yoshitomi et al. | 428/336 |
| 4,794,053 | 12/1988 | Tustison | 428/627 |
| 4,837,118 | 6/1989 | Yamamoto et al. | 428/645 |
| 4,849,304 | 7/1989 | Uchiyama et al. | 428/694 XS |
| 4,861,656 | 8/1989 | Uchiyama et al. | 428/333 |
| 4,922,454 | 5/1990 | Taki | 365/122 |

FOREIGN PATENT DOCUMENTS

| | | |
|---|---|---|
| 0314518 | 3/1985 | European Pat. Off. . |
| 0 239 974 A2 | 10/1987 | European Pat. Off. . |
| 0 411 860 A2 | 2/1991 | European Pat. Off. . |
| 0 445 957 A2 | 9/1991 | European Pat. Off. . |
| 0 448 919 A2 | 10/1991 | European Pat. Off. . |
| 1-050258 | 2/1989 | Japan . |
| 1-173457 | 7/1989 | Japan . |

OTHER PUBLICATIONS

"Multi-Valued Magneto-Optical Recording in TbFe/SiO Compositionally Modulated Films," Saito et al., Proc. Int. Symp. on Optical Memory, *Japanese Journal of Applied Physics*, vol. 28 (1989) Supplement 28-3, pp. 343-347.

"High carrier-to-noise ratio achieved on magneto-optic recording disks using a plurality of magneto-optic recording layers," Lin, *Appl. Phys. Lett.*, 62(6), 8 Feb. 1993, pp. 636-638.

*Primary Examiner*—Leszek Kiliman
*Attorney, Agent, or Firm*—Eric D. Levinson

[57] ABSTRACT

A magneto-optic recording medium including a transparent substrate and a magneto-optic stack provided thereon. The stack includes a plurality of magneto-optic film layers less than 10 nm thick. Adjacent magneto-optic film layers are separated by dielectric layers consisting essentially of $Y_2O_3$.

12 Claims, 1 Drawing Sheet

MAGNETO-OPTIC RECORDING MEDIUM HAVING MAGNETO-OPTIC FILM LAYERS SEPARATED BY YTTRIUM OXIDE

FIELD OF THE INVENTION

The present invention relates generally to magneto-optic recording media and more specifically to dielectrics used in such media.

BACKGROUND OF THE INVENTION

Many current magneto-optic (MO) media constructions are four-layer (quadrilayer) thin film stacks, formed by successively depositing the individual layers on a transparent substrate. The layers consist of a first dielectric layer, a rare-earth-transition metal (RE-TM) magneto-optic layer which exhibits perpendicular magnetic anisotropy, a second dielectric layer, and a metallic reflector layer. RE-TM layers are highly reactive and must be protected from the ambient environment to achieve stability. One function of the two adjacent dielectric layers is to serve as a barrier between the MO film and surrounding environment. In addition the dielectrics must exhibit appropriate optical properties and acceptably low reactivity with the adjacent RE-TM magneto-optic film.

The rare earth-transition metal magneto-optical layer in current media is typically 20 nm to 60 nm thick. It has been suggested, however, that media structures employing a multiplicity of MO layers may be advantageous, e.g., for multilevel recording applications or mark-edge jitter reduction.

The functionality of the preceding multiple-layer MO schemes generally depends upon interaction of an appreciable fraction of the incident optical power from the laser with each MO layer. However, for a typical terbium-iron-cobalt (Tb-Fe-Co) MO quadrilayer construction, less than 5% of the incident power is present at the interface between a 30 nm thick FeTbCo layer and the adjacent second dielectric layer. Consequently, while the actual thicknesses may vary with the specific materials and media construction, it is apparent that the total MO thickness in practical multiple-layer constructions cannot become arbitrarily large. If the total MO layer thickness is limited, it is clear that the thickness of each individual layer must decrease as the number of individual layers increases. The benefits attributable to the multiple-magnetic-layer structures (e.g., increased storage density, decreased jitter, etc.) generally increase as the number of layers, N, increases; consequently, structures containing a large number of very thin MO layers are desirable.

SUMMARY OF THE INVENTION

The bias field response of the MO media can also be greatly improved by constructions employing two or more MO layers separated by thin dielectric films (i.e. "broken layer" constructions). This improved bias response is highly desirable for recording applications which employ magnetic field modulation during writing.

While it may be desirable to create an MO structure having several very thin MO layers, the construction of such structures is complicated by the fact that as the thickness of the MO layer is reduced, the ratio of: (1) the interfacial area between the MO layer and adjacent dielectric layer to (2) the volume of the MO layer increases. Thus, for these very thin MO layers, the interfacial reactivity and/or interactions of the adjacent dielectric layers with the MO layers can have an increasingly large and detrimental influence on the magnetic properties of the MO layer. I have discovered that the use of a dielectric consisting essentially of yttrium oxide, $YO_x$, such as $Y_2O_3$, solves this problem.

Accordingly, the present invention provides a magneto-optic recording medium comprising a magneto-optic stack on a transparent substrate. The stack includes at least two layers of an MO film, each of which is less than 10 nm thick. Adjacent layers of the MO film are separated by dielectric layers comprising $Y_2O_3$. The MO layer may be a rare earth transition metal alloy, such as terbium-iron-cobalt (TbFeCo). The dielectric layer is preferably at least 1 nm thick. The MO film layers may be about 4 nm thick. The magneto-optic stack may include as many as three, or six or more MO film layers. Optionally, a protective layer may be provided over the MO stack.

Another embodiment of the present invention includes a magneto-optic recording medium comprising at least two yttrium oxide/MO layer/yttrium oxide sandwiches on a transparent substrate. The sandwiches are separated from one another by a substantially transparent spacer layer.

The present invention also includes an MO recording system which includes the MO recording media discussed above and a focused laser beam which is positioned to enter the media through the substrate. The laser beam must be capable of heating at least one of the MO layers to a temperature sufficient to allow magnetization reversal of that MO layer(s). A photodetector is positioned to detect the reflected laser beam exiting the media.

The $YO_x$-based dielectric layers disclosed herein preferably are comprised of at least 50% $Y_2O_3$, more preferably at least 70%, and most preferably at least 90% $Y_2O_3$.

DETAILED DESCRIPTION

Figure 1:
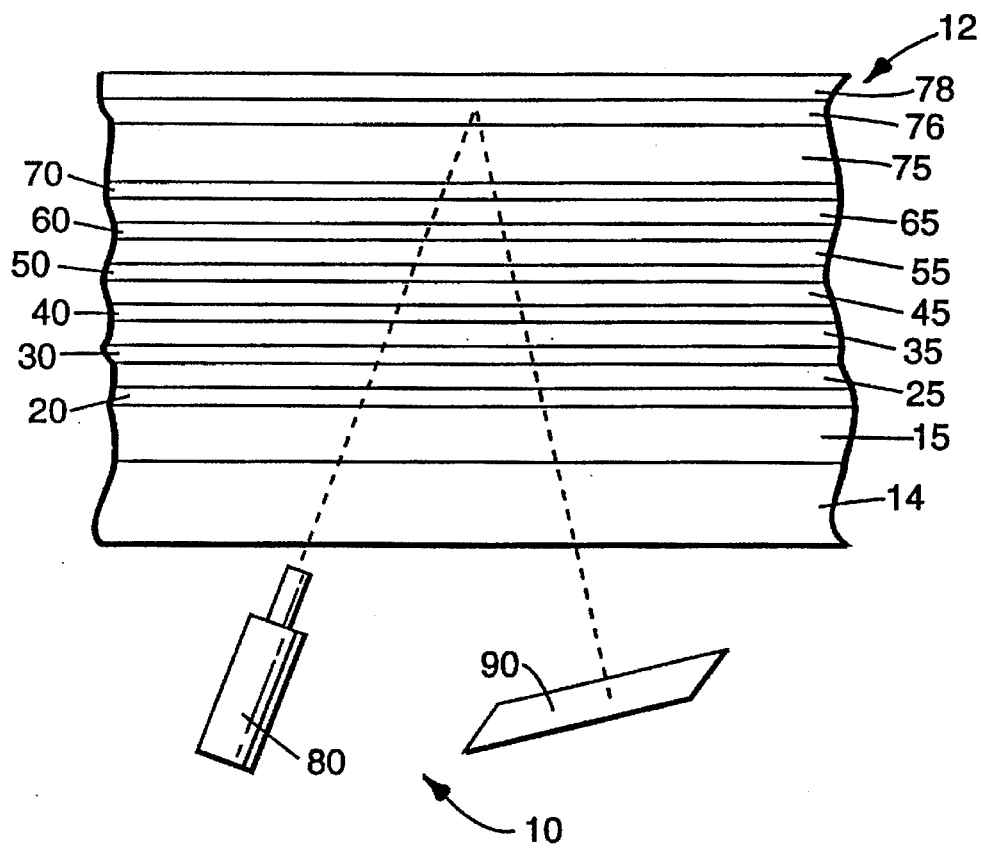
FIG. 1 is a schematic side view of a magneto-optic recording system according to one embodiment of the present invention.

A magneto-optic (MO) recording system according to one embodiment of the present invention is shown in FIG. 1. Recording System 10 is comprised of MO recording medium 12, laser 80, and photo detector 90. Medium 12 is comprised of transparent substrate 14 and an MO stack provided thereon. The MO stack includes alternating layers of dielectrics 15, 25, 35, 45, 55, 65, and 75 and MO film layers 20, 30, 40, 50, 60, and 70. A reflector layer 76 may also be included, as may an optional protective layer 78 (e.g., seal coat).

The MO film layers preferably comprise a rare earth transition metal alloy, such as TbFeCo. The MO film layers are preferably less than about 10 nm thick, and more preferably less than about 4 nm thick.

Dielectric layers 25, 35, 45, 55, and 65 consist essentially of yttrium oxide ($Y_2O_3$) and are preferably at least 1 nm thick, and more preferably at least about 3 nm thick.

Substrate 14 may be formed of any material having high transparency to laser beams which is also nonmagnetic and dimensionally stable. The substrate is usually made of a polymeric resin having excellent impact strength such as a polycarbonate, a polymethylmethacrylate, an acrylate, or an epoxy.

Dielectric layers 15 and 75 preferably comprise a dielectric material such as yttrium oxide, aluminum oxide, silicon carbide, silicon nitride or silicon dioxide, although other known dielectric materials may be used. Dielectric layers 15 and 75 typically have a thickness in the range from about 5 to 100 nm.

Reflector layer 76 typically comprises a highly reflective metal such as aluminum, gold, silver, or some alloy thereof. Reflective layer 76 typically ranges from about 20–100 nm thick. Optional protective layer 78 is deposited on reflector layer 76 to additionally protect the thin film materials in the MO layers from reacting with elements in the surrounding environment. Protective layer 78 preferably comprises a photocurable polymer with a thickness of greater than 3 μm.

Figure 2:
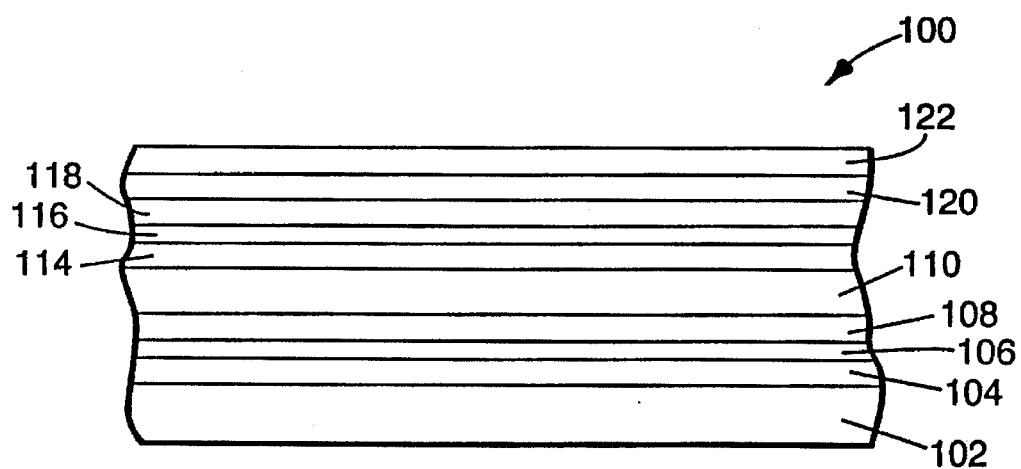
FIG. 2 is a schematic side view of a magneto-optic recording medium according to another embodiment of the present invention.

An alternative embodiment of the present invention is shown in FIG. 2. MO recording medium 100 is comprised of transparent substrate 102 and an MO stack provided thereon. The MO stack is comprised of MO layers 106 and 116, dielectric layers 104, 108, 114, and 118, transparent spacer layer 110, e.g., a photopolymer, optional reflector layer 120, and optional protective layer 122 (e.g., seal coat). The MO layers, dielectric layers, and optional reflective and protective layers are preferably the same as those described above with reference to FIG. 1. The dielectric layers are yttrium oxide, as described with respect to FIG. 1, but are preferably at least 5 nm thick, and more preferably, at least 10 nm thick.

In FIG. 2, first sandwich of dielectric 104, MO layer 106, and dielectric 108 is separated from a second sandwich of dielectric 114, MO layer 116, and dielectric 118 by transparent spacer layer 110. The purpose of transparent spacer layer 110 is to physically separate the two dielectric-MO layer-dielectric sandwiches a distance at least several times greater than the depth of focus of the optical system used to record and read data from the MO medium. If transparent spacer layer 110 is sufficiently thick, it should be possible to record and reproduce information from either of the dielectric/MO layer/dielectric sandwiches independent of the data on the other dielectric/MO layer/dielectric sandwich, thereby increasing the data storage capacity of medium 100. Transparent spacer layer 110 should be at least about 10 μm thick, but preferably less than about 50 μm thick. Preferred materials for transparent spacer layer 110 include materials, such as photopolymers, which are substantially transparent over the 450 nm to 850 nm wavelength range of the laser light which could be used to record and reproduce information on the dielectric/MO layer/dielectric sandwiches; one class of preferred photopolymers for transparent spacer layer 110 is the photocurable acrylates. Although only a single photopolymer layer is shown separating two dielectric/MO/dielectric sandwiches in FIG. 2, additional dielectric/MO/dielectric sandwiches may be added by the inclusion of additional photopolymer layers separating the sandwiches.

The present invention will be further illustrated by the following non-limiting Examples.

EXAMPLE 1

Sandwiches of dielectric/MO film/dielectric were deposited onto commercially available silicon (100) wafers using a computer-controlled ion beam deposition system. A 225 mA, 900 eV Xe$^+$ primary beam was used, which yielded a deposition rate of 3–6 nm/min. The sandwiches consisted of a ≈24 nm thick TbFeCo film sandwiched between two 40 nm thick layers of a particular dielectric. The TbFeCo MO films were alternately deposited from an Fe-5.3 at. % Co alloy target and an elemental Tb target. The Fe—Co and Tb deposition times were programmed to produce a layered structure with the desired composition and a nominal repeat periodicity of 1 nm, i.e., the MO film structure consisted of 24 FeCO—Tb layered pairs. Si, SiC$_x$, Si$_3$N$_4$, SiO, HfO$_2$, and Y$_2$O$_3$ targets were used to produce the dielectric films adjacent the MO film. As no reactive gases were employed during deposition, films deposited from compound targets comprising a volatile constituents (i.e., oxygen and nitrogen) are likely somewhat deficient in O or N relative to the starting target composition. As the exact stoichiometry of the deposited dielectrics is unknown, the materials are referred to as SiN$_x$, HfO$_x$, etc., in Table 1. All dielectric targets except Si were formed from hot pressed powder compacts. The Si target was a dense polycrystalline material. All targets were obtained commercially. MO film composition for each dielectric/MO film/dielectric sandwich was determined using X-ray fluorescence. The average MO film composition for the specimens described in Table 1 was 77.0 at. % Fe, 3.5 at. % Co, and 19.5 at. % Tb. The standard deviation of the Tb content in the films was about 0.5 at. %.

TABLE 1

| Dielectric | $M_s$ (emu/cm$^3$) | $M_sH_c$ (ergs/cm$^3$) | $T_d$ (C.) | $T_c$ (C.) 1000/5000 Oe |
|---|---|---|---|---|
| SiC$_x$ | 98 | 3.3 × 10$^5$ | 150 | 160/175 |
| SiN$_x$ | 89 | 5.1 × 10$^5$ | 160 | 170/175 |
| SiO$_x$ | 100 | 4.8 × 10$^5$ | 165 | 165/175 |
| HfO$_x$ | 74 | 4.6 × 10$^5$ | 160 | 165/175 |
| YO$_x$ | 100 | 3.7 × 10$^5$ | 155 | 160/175 |
| Si | 62 | 4.8 × 10$^5$ | 150 | 175/175 |

A vibrating sample magnetometer with specimen temperature control was used to determine magnetic properties. Saturation magnetization, $M_s$, and the magnetic energy product, $M_sH_c$, perpendicular to the film plane were determined from hysteresis loops at 30° C. The Curie temperature, $T_c$ was determined by measuring perpendicular magnetization as a function of temperature. One common practice is to apply a small perpendicular field (500–1000 Oe) during the measurement to maintain perpendicular magnetization as $T_c$ is approached. $T_d$ is defined as the temperature at which the remanent magnetization, $M_r$, becomes less than half $M_s$ at the same temperature. $T_d$ was determined by saturating the specimens in the perpendicular direction at 30° C., monitoring the remanent magnetization as a function of temperature, and noting the temperature at which remanent magnetization suddenly decreased. Comparison with the magnetization-temperature data used to determine $T_c$ enabled estimation of $T_d$. It is speculated that $T_d$ roughly corresponds to the temperature at which spontaneous erasure would occur in a magneto-optical recording application. Structures with values of $T_d$ substantially lower than $T_c$ thus are likely to exhibit poor recording performance in conventional media constructions. Examination of Table 1 reveals that although some differences are observable, the magnetic properties of the ≈24 nm thick MO films are relatively consistent and insensitive to the composition of the adjacent dielectric films.

EXAMPLE 2

In Example 2, an optical stack of six 4 nm thick films of TbFeCo separated by 3 nm thick dielectric material separator layers was deposited in the same manner as in Example 1. Note that the six 4 nm thick TbFeCo films have a total thickness equal to the single 24 nm thick TbFeCo film in Example 1.

The same variables $M_s$, $M_sH_c$, $T_d$, and $T_c$ discussed above with reference to Table 1 were measured for the films in Example 2, as shown in Table 2. For several of the structures, a 1000 Oe field was insufficient to prevent obvious demagnetization. Consequently, $T_c$ was also determined in an applied field of 5,000 Oe. X-ray fluorescence measurements of the specimens described on Table 2 yielded an average MO film composition of 77.1 at. % Fe, 3.4 at. % Co., and 19.5 at. % Tb. The standard deviation of the Tb content in these film was about 0.8 at. %.

TABLE 2

| Dielectric | $M_s$ (emu/cm³) | $M_sH_c$ (ergs/cm³) | $T_d$ (C.) | $T_c$ (C.) 1000/5000 Oe |
|---|---|---|---|---|
| $SiC_x$ | 111 | $7.9 \times 10^3$ | <50 | 100/120 |
| $SiN_x$ | 198 | $2.7 \times 10^4$ | <45 | —/150 |
| $SiO_x$ | 291 | $1.8 \times 10^4$ | <30 | —/170 |
| $HfO_x$ | 166 | $4.0 \times 10^4$ | 60 | 120/140 |
| $YO_x$ | 131 | $2.3 \times 10^5$ | 130 | 150/160 |
| Si | 80 | $1.6 \times 10^4$ | 80 | —/115 |

Comparison of the Table 1 and Table 2 data reveals that, for a given dielectric, the magnetic properties of the specimens comprising six 4 nm thick MO films (6×4 nm) generally differ significantly from those of the specimens comprising a single 24 nm thick MO film (1×24 nm). For example, the $M_s$ value of specimens comprising $SiN_x$, $SiO_x$, and $HfO_x$ dielectrics increases by more than a factor of two for the 6×4 nm structure specimens. Comparison of the energy product values between Tables 1 and 2 additionally shows that the energy products of the 6×4 nm structures are drastically reduced in comparison to the 1×24 nm structures employing the same dielectric material. Closer inspection of Tables 1 and 2 demonstrates that, of the dielectric materials examined in this study, $YO_x$ causes by far the smallest changes in magnetic properties between the 1×24 nm and 6×4 nm structures. $YO_x$ is the only dielectric material examined for which the energy product of the 6×4 nm structure remains greater than $1\times10^5$ ergs/cm³, and is also the only material for which $T_d$ in the 6×4 nm structure is greater than 120° C. In contrast, the substantially lower values of $M_sH_c$ and $T_d$ exhibited by the 6×4 nm structures employing any other dielectric material would likely make these structures unusable for high performance recording applications.

I claim:

1. A magneto-optic recording medium, comprising a transparent substrate and magneto-optic stack provided thereon, the stack comprising a plurality of layers of a magneto-optic film each having a thickness up to 10 nm, wherein each of the layers of the magneto-optic film is separated from each other by a dielectric layer consisting essentially of $YO_x$.

2. The medium of claim 1, wherein each dielectric layer is at least 1 nm thick.

3. The medium of claim 2, wherein the magneto-optic film comprises a rare earth transition metal alloy.

4. The medium of claim 3, wherein the alloy comprises terbium-iron-cobalt.

5. The medium of claim 2, wherein the magneto-optic film layers are each less than about 4 nm thick.

6. The medium of claim 5, wherein the magneto-optic stack comprises at least three magneto-optic film layers.

7. The medium of claim 5, wherein the magneto-optic stack comprises at least six magneto-optic film layers.

8. The medium of claim 1, wherein the $YO_x$ is comprised of at least 70% $Y_2O_3$.

9. The medium of claim 1, wherein the dielectric layers are further provided between the magneto-optic stack and the substrate and on the opposite end of the stack.

10. The medium of claim 9, wherein two magneto-optic film layers are further separated from each other by a transparent spacer layer.

11. A magneto-optic recording medium, comprising in order:

a transparent substrate;

a magneto-optic film stack comprising at least three magneto-optic layers comprising terbium-iron-cobalt, each magneto-optic layer having a thickness up to about 10 nm, wherein each of the magneto-optic layers is separated from each other by a dielectric layer consisting essentially of $Y_2O_3$ at least about 1 nm thick; and a protective layer.

12. A magneto-optic recording system, comprising:

a magneto-optic recording medium, comprising a transparent substrate and magneto-optic stack provided thereon, the stack comprising a plurality of layers of a magneto-optic film each having a thickness up to 10 nm, wherein each of the layers of the magneto-optic film is separated from each other by a dielectric layer consisting essentially of $Y_2O_3$; and a focused laser beam positioned to enter the medium through the substrate for heating at least one of the magneto-optic layers to a temperature sufficient to allow magnetization reversal of said at least one layer.

* * * * *